June 2, 1953  P. D. BECKER  2,640,245
MOUNTING OF THREADED FASTENING DEVICES
Filed June 27, 1951
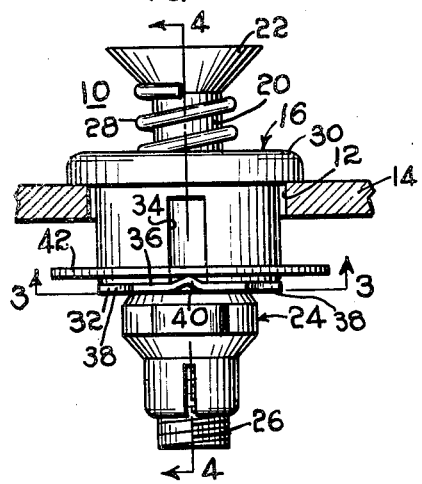
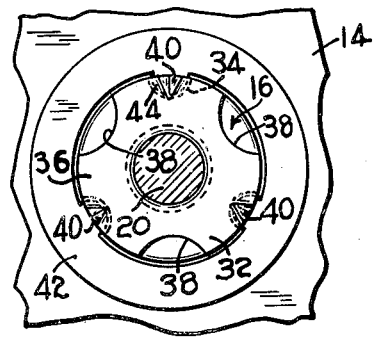
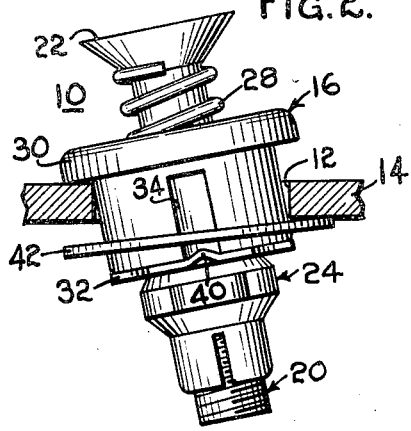
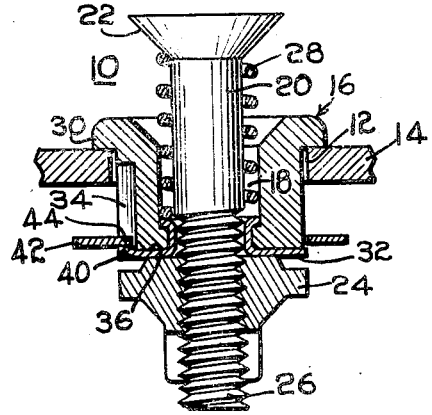
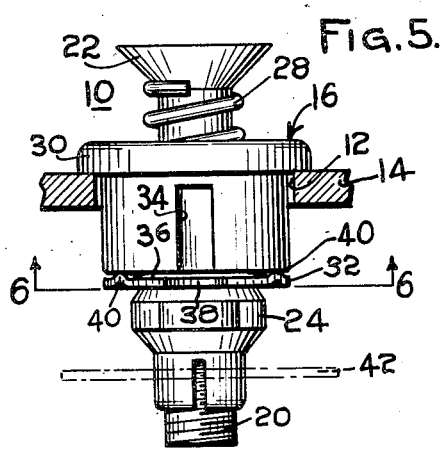
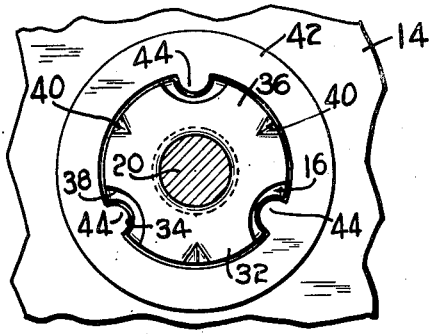
INVENTOR:
PHILIP D. BECKER,
BY Robert E Ross
AGENT.

Patented June 2, 1953

2,640,245

UNITED STATES PATENT OFFICE 2,640,245

MOUNTING OF THREADED FASTENING DEVICES

Philip D. Becker, Hingham, Mass., assignor to United-Carr Fastener Corporation, Cambridge, Mass., a corporation of Massachusetts Application June 27, 1951, Serial No. 233,910

7 Claims. (Cl. 24—221)

This invention relates generally to fastening devices, and has particular reference to a removable bushing assembly for mounting into a panel opening.

In the construction of aircraft, it is necessary to provide removable panel portions for access to the interior of portions of the airframe, and such panels are commonly attached to the main body panels by rotary operative fasteners. A stud member is usually mounted on the removable panel, and a socket member is mounted on the stationary panel to receive the stud. During operation of the fastener, it frequently happens that the stud member is deformed or otherwise damaged, rendering it inoperative, and hence it is desirable that the stud portion of the fastener be readily replaceable. In some applications, the access panel cannot be lifted directly away from the panel after the fasteners are disengaged, but must be removed by an upward and sideways movement, and in such cases it is necessary that the stud be capable of substantial tilting movement in relation to the panels.

The object of the invention is to provide a bushing assembly for mounting a stud device on a panel, in which the bushing is adapted for rapid assembly and disassembly from a panel opening.

A further object of the invention is to provide a bushing assembly in which a bushing retaining washer is locked in position on the bushing by means of a rotatable locking plate disposed on the end of the bushing.

A still further object of the invention is to provide a bushing assembly having a retaining washer mounted on a bushing with washer tongue portions disposed in longitudinal grooves in the bushing, in which a rotatable locking plate disposed on the end of the bushing is provided with groove-closing means, and apertures intermediate the groove-closing means for alignment with the grooves to permit removal of the retaining ring by rotation of the plates into a predetermined position in relation to the bushing.

Another object of the invention is to provide a stud assembly in which a stud member is mounted on a panel by means of a removable bushing which is tiltable in a panel opening to allow tilting of the stud during engagement and disengagement of the stud with a cooperating socket member mounted on another panel.

Other objects of the invention will, in part, be obvious, and will, in part, appear hereinafter.

In the drawing:

Fig. 1 is a view in elevation of a removable stud assembly embodying the features of the invention;

Fig. 2 is a view of the stud assembly of Fig. 1 showing how the bushing assembly permits tilting of the stud in relation to the panel;

Fig. 3 is a view in section taken on line 3—3 of Fig. 1;

Fig. 4 is a view in section taken on line 4—4 of Fig. 1;

Fig. 5 is a view in elevation of the stud assembly of Fig. 1 showing the locking plates in position to permit assembly or disassembly of the retaining ring from the bushing; and Fig. 6 is a view in section taken on line 6—6 of Fig. 5.

Referring to the drawing, there is illustrated a stud assembly 10, which is adapted for mounting into an opening 12 in a panel 14, so that the stud assembly 10 is securely retained in assembly therewith but is capable of substantial tilting movement in relation to the panel.

The stud assembly 10 comprises generally a bushing 16 having a central opening 18, a bolt 20 extending through the opening 18, having a head 22 disposed on one side of the bushing and a friction lock nut 24 disposed on a threaded portion 26 on the other side of the bushing, and a spring 28 disposed about the bolt between the head 22 and the bushing, to urge the bolt longitudinally in the opening 18 so that the head 22 of the bolt normally protrudes from the bushing.

The bushing is provided with a flange 30 at one end for bearing against one side of the panel, a locking plate 32 assembled onto the other end, and a series of grooves 34 extending longitudinally in the surface of the bushing. The locking plate 32 is rotatable relative to the bushing, and is provided with peripheral portions 36 which are adapted to cover the ends of the grooves 34 when the plate is in the proper rotational position in relation to the bushing (see Figs. 1 and 3), and a series of apertures 38 disposed in the edge of the locking plate intermediate the peripheral portions 36. The apertures 38 are disposed about the plate 32 in positions corresponding to the positions of the grooves on the bushing, so that the apertures may be aligned with the ends of the grooves by rotation of the plate into a predetermined position in relation to the bushing (see Figs. 5 and 6). To retain the plate in position with the peripheral portions covering the grooves, embossed detents 40 are provided to enter the ends of the grooves 34 to prevent accidental rotation of the plate.

To retain the bushing in assembly with the plate, a retaining washer 42 is provided for assembly onto the bushing, having a central opening for receiving the bushing and a series of tongues 44 which extend radially inwardly into the opening, for entering the grooves 34 on the bushing.

To assemble the device into a panel opening, the bushing is inserted into the opening so that it protrudes from the lower surface thereof. The locking plate is initially positioned so that the apertures 38 therein are aligned with the grooves 34, so that the retaining washer 42 may be slipped over the end of the bushing, with the tongues 44 entering the grooves 34. The locking plate may then be rotated in either direction, so that the peripheral portions 36 pass over the ends of the grooves 34, thereby closing said ends to prevent removal of the retaining washer, and the detents 40 enter the ends of the grooves to retain the plate in the socked position.

After such operation the stud assembly is securely retained in the panel opening, but is capable of substantial tilting movement therein, as illustrated in Fig. 2, to permit sideways movement of the panel 14 when it is being removed from another panel.

The illustrated assembly is particularly useful for assembly with a socket member of appropriate design such as the type having a nut-engaging plate with a suitably shaped slot through which the nut 24 can pass when it is in a predetermined rotational position, with stop members disposed to engage the nut so as to limit the rotation thereof after it has passed through the opening. Such sockets are fully described in my copending application filed June 27, 1951, Serial No. 233,909, entitled "Fastener Assembly." However, the use of the illustrated device is not limited to such type of sockets, but may be used in any application where a bolt is to be removably assembled with a panel.

The bushing assembly is not only useful for the assembly of studs of aircraft cowling fasteners, but may also be used for the assembly of any other device where rapid assembly and disassembly is required to replace a worn or damaged part.

To remove the bushing from the panel 14, the locking plate 32 is rotated until the apertures 38 are aligned with the grooves 34, so that the retaining washer may be removed from the bushing. The bushing may then be lifted out of the panel opening.

If tilting movement of the bushing is not desired or required, the length of the bushing may be decreased, or the thickness of the retaining washer may be increased so that the washer is confined tightly between the panel 14 and the locking plate 32, thereby preventing vertical or tilting movement of the bushing relative to the plate.

Since certain other obvious modifications may be made in the device without departing from the scope of the invention, it is intended that all matter contained herein be interpreted in an illustrative and not in a limiting sense.

I claim:

1. A bushing assembly for mounting into a panel opening, said bushing having a flange at one end, a rotatable locking plate assembled onto the other end, and longitudinal grooves disposed in the outer surface and extending from the other end, and a retaining ring for assembly onto the bushing, said ring having portions for extending into the bushing grooves, said locking plate having means for closing the ends of the grooves, and apertures in the edge thereof intermediate the groove-closing means, said apertures being adapted for alignment with the grooves to permit removal of the retaining ring by rotation of the plate into a predetermined position in relation to the bushing.

2. A removable bushing assembly for mounting into an opening in a panel, comprising a bushing having a body member for extending through the opening and a flange portion at one end of the body for seating against one side of the panel, said body portion having a series of longitudinal grooves disposed in the outer surface, a retaining ring assembled about the body and longitudinally movable thereon, said retaining ring having tongues extending into said grooves, and a locking plate disposed on the end of the bushing opposite the flange, said plate being rotatable relative to the bushing and having peripheral portions adapted to cover the ends of the grooves when the plate is in a predetermined rotational position in relation to the bushing to prevent removal of the retaining ring, and apertures disposed between said peripheral portions, said apertures extending to the edge of the plate and being spaced thereabout to correspond to the spacing of the grooves on the bushing, whereby said plate may be rotated into another predetermined position so that the apertures are disposed opposite said grooves to permit removal of the retaining ring.

3. A removable bushing assembly for mounting into an opening in a panel, comprising a bushing having a body member for extending through the opening and a flange portion at one end of the body for seating against one side of the panel, said body portion having longitudinal grooves disposed therein, a retaining ring for assembly about the body so as to be longitudinally movable thereon, said retaining ring having tongues for projecting into said grooves, and a locking plate disposed on the end of the bushing body opposite the flange, said plate being rotatable relative to the bushing and having locking portions disposed about the periphery which are adapted to cover the ends of the grooves to prevent removal of the retaining ring when the plate is in a predetermined position relative to the bushing, and apertures disposed in the edge of the plate between the locking portions, said apertures having a spacing about the periphery of the plate corresponding to the spacing of the grooves about the bushing body, whereby said plate may be rotated into another predetermined position so that the apertures are disposed below said grooves to permit removal of the retaining ring, and means for securing said plate in a predetermined rotational position in relation to said bushing.

4. A bushing assembly as set forth in claim 1 in which the peripheral portions adapted to cover the ends of the grooves are provided with means for seating in the grooves to retain the plate in a predetermined rotational position in relation to the bushing.

5. A bushing assembly as set forth in claim 1 in which the peripheral portions of the plate which are adapted to cover the ends of the grooves are provided with a detent adapted to enter the ends of the grooves to retain the plate in the locking position.

6. A removable stud assembly for mounting into an opening in a panel, comprising a bushing, a bolt extending through the bushing having a head on one side thereof and a friction lock nut on the other side, a spring disposed about the bolt between the head and the bushing to urge the bolt longitudinally in the bushing, said bushing having a body portion for protruding through the panel opening with a flange at one end for bearing against one side of the panel, a locking plate assembled on the other end, and a series of longitudinal grooves extending therebetween in the outer surface of the body portion, and a retaining ring disposed about the bushing having tongue members extending into the grooves, said locking plate being rotatable relative to the bushing and having peripheral locking portions adapted to cover the ends of the grooves when the plate is in a predetermined rotational position in relation to the bushing to prevent removal of the retaining ring from the bushing, and apertures in the edge of said plate intermediate said peripheral locking portions, said apertures being spaced on the plate to correspond to the spacing of the grooves on the bushing, whereby said plate may be rotated from a locking position into an unlocking position so that the apertures in the plate are aligned with the grooves to allow removal of the retaining ring and disassembly of the bushing from the panel.

7. A removable stud assembly as set forth in claim 6 in which said locking plate is provided with means on said peripheral locking portions for entering the ends of the grooves to retain the plate in the locking position.

PHILIP D. BECKER.

No references cited.